United States Patent [19]
Walkden

[11] Patent Number: 5,795,125
[45] Date of Patent: Aug. 18, 1998

[54] TRUCK RAMP ASSEMBLY

[76] Inventor: Charles D. Walkden, P.O. Box 2017, Homer, Ak. 99603

[21] Appl. No.: 677,845

[22] Filed: Jul. 10, 1996

[51] Int. Cl.⁶ ................................................ B65G 67/02
[52] U.S. Cl. .......................................... 414/537; 14/71.1
[58] Field of Search ............................ 414/537, 538, 414/522; 296/61; 14/69.5, 71.1

[56] References Cited

U.S. PATENT DOCUMENTS

| | | | |
|---|---|---|---|
| 3,687,314 | 8/1972 | Haugland | 414/522 |
| 3,870,170 | 3/1975 | Noble et al. | 414/537 |
| 4,294,571 | 10/1981 | Tordella | 414/537 |
| 4,601,632 | 7/1986 | Agee | 414/537 |
| 4,624,619 | 11/1986 | Uher | 14/71.1 X |
| 4,685,857 | 8/1987 | Goeser et al. | 414/537 X |
| 4,900,217 | 2/1990 | Nelson | 414/537 |
| 5,064,335 | 11/1991 | Bergeron et al. | 414/522 |
| 5,257,894 | 11/1993 | Grant | 414/537 |
| 5,305,486 | 4/1994 | Smith et al. | 414/522 X |
| 5,331,701 | 7/1994 | Chase et al. | 414/537 X |

*Primary Examiner*—David A. Bucci
*Attorney, Agent, or Firm*—Alfred F. Hoyte, Jr.

[57] ABSTRACT

An extendable ramp assembly for pickup trucks and the like is provided. A platform assembly having a hollow interior is bolted to the floor of the truck bed. A sliding platform is adjustably positioned within the platform assembly to allow for adjusting the angle of incline of an extendable ramp which is attached thereto. The sliding platform is designed to have a minimal thickness so that compression of the platform assembly does not affect movement of the sliding platform. A hinge plate is connected to the ramp to allow for a relatively smooth and continuous surface between the ramp and the top surface of the platform assembly.

5 Claims, 7 Drawing Sheets

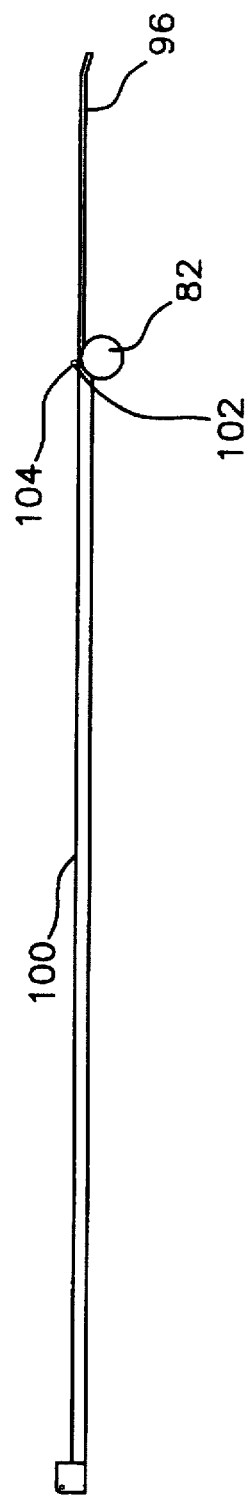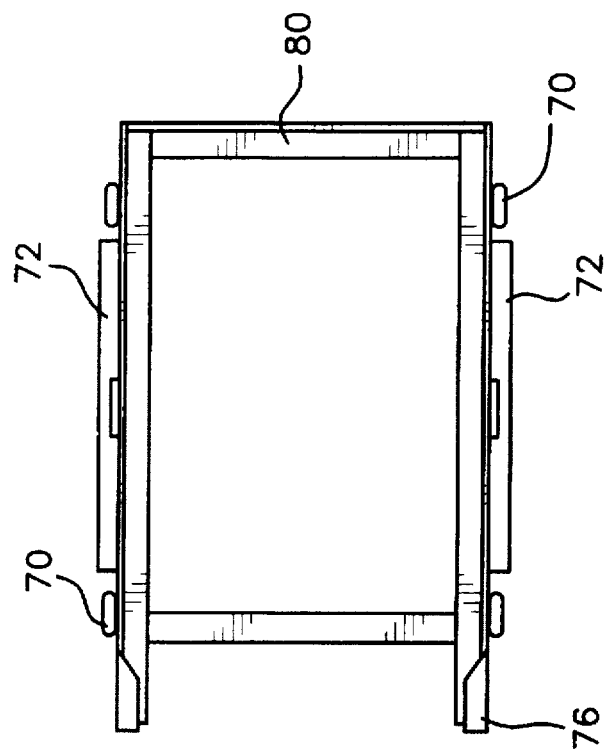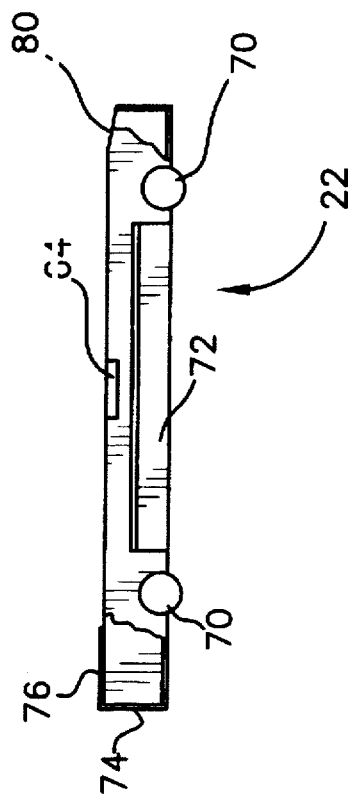

TRUCK RAMP ASSEMBLY

BACKGROUND OF THE INVENTION

1. Field of the Invention

The present invention relates to extendable ramp assemblies for trucks. More specifically, it relates to an improved ramp assembly for trucks which is stowable underneath and contained within a platform.

Thus it can be seen that the potential fields of use for this invention are myriad and the particular preferred embodiment described herein is in no way meant to limit the use of the invention to the particular field chosen for exposition of the details of the invention.

A comprehensive listing of all the possible fields to which this invention may be applied is limited only by the imagination and is therefore not provided herein. Some of the more obvious applications are mentioned herein in the interest of providing a full and complete disclosure of the unique properties of this previously unknown general purpose article of manufacture. It is to be understood from the outset that the scope of this invention is not limited to these fields or to the specific examples of potential uses presented hereinafter.

2. Description of the Prior Art

Extendable truck ramp assemblies are old and well known in the art. The following known prior art has been directed to providing a summary of the devices of the prior art. As will be seen, the simplicity and effectiveness of my invention is not rivaled in the prior art.

U.S. Pat. No. 4,601,632 issued to Agee, discloses a stowable truck ramp assembly. While the operation of the Agee device is somewhat similar to the device of the present invention the structure is different in at least two ways. First, the Agee device has no wheels or slides so that the ramp simply slides out with metal sliding on metal. Second, the Agee device has a plurality of ramps of relatively small width whereas the present invention has a single ramp with a width just slightly less than the width of the pickup truck.

U.S. Pat. No. 3,642,156, issued to Stenson shows a folding truck loading ramp which attaches to the rear gate of pickup trucks. By contrast, the device of the instant invention attaches to the floor of the bed of the pickup truck and slides out as opposed to folding.

U.S. Pat. No. 4,242,032, issued to Whiteman et al., has a ramp and ramp carrier for a truck. The ramp is narrow relative to the truck width and includes a single central track within which a pair of wheels attached to the ramp roll to allow for slidably extending the ramp from the rear of the truck. By contrast, the device of the instant invention has a ramp which is approximately the same width of the truck and has a pair of tracks along with a plurality of wheels to ensure smooth extension and retraction of the ramp even under adverse conditions, e.g., mud or snow.

U.S. Pat. No. 4,685,857, issued to Goeser et al., shows a ramp assembly for attachment to the load carrying bed of a vehicle. The ramp assembly has a complicated locking structure and roller assembly which allows for repositioning of the platform assembly. A ramp assembly is connectable to the platform assembly and is capable of being slidably moved therewithin. By contrast, the device of the instant invention is of relatively simple construction and has a sliding member which is attached to a ramp which can be telescopingly extended therefrom.

None of the above inventions and patents, taken either singly or in combination, is seen to describe the instant invention as claimed.

SUMMARY OF THE INVENTION

Briefly, the invention comprises an extendable ramp assembly for pickup trucks and the like. A platform assembly having a hollow interior is bolted to the floor of the truck bed. A sliding platform is adjustably positioned within the platform assembly to allow for adjusting the angle of incline of an extendable ramp which is attached thereto. The sliding platform is designed to have a minimal thickness so that compression of the platform assembly does not affect movement of the sliding platform. A hinge plate is connected to the ramp to allow for a relatively smooth and continuous surface between the ramp and the top surface of the platform assembly.

Accordingly, it is a principal object of the invention to provide a new and improved truck ramp assembly which overcomes the disadvantages of the prior art in a simple but effective manner.

It is a major object of this invention to provide an improved truck ramp assembly which can be attached to the bed of a conventional pickup truck.

It is another object to provide a truck ramp assembly having a ramp attached to an adjustable slide assembly.

It is another object of the invention to provide an improved truck ramp assembly having a ramp with adjustable incline.

It is another object of the invention to provide an improved truck ramp assembly having load support frames to decrease deflection of weight bearing surfaces.

It is another object of the invention to provide an improved truck ramp assembly having a movable plate assembly which allows for a substantially continuous surface from the ramp to the platform.

Finally, it is a general goal of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

The present invention meets or exceeds all the above objects and goals. Upon further study of the specification and appended claims, further objects and advantages of this invention will become apparent to those skilled in the art.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 6 shows a side view partly in section of the sliding platform.

FIG. 7 shows a top view of the sliding platform.

FIG. 9 shows a side view of the ramp.

DETAILED DESCRIPTION OF THE PREFERRED EMBODIMENTS

Figure 1A:
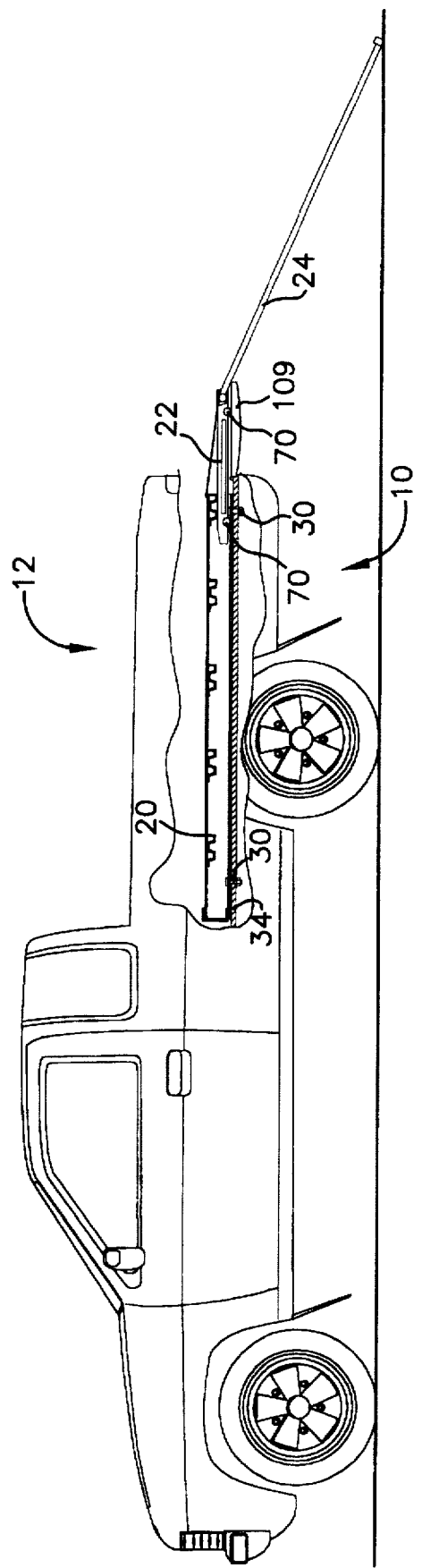
FIG. 1A is a sectional side view of the present invention installed in a pickup truck.
Figure 1B:
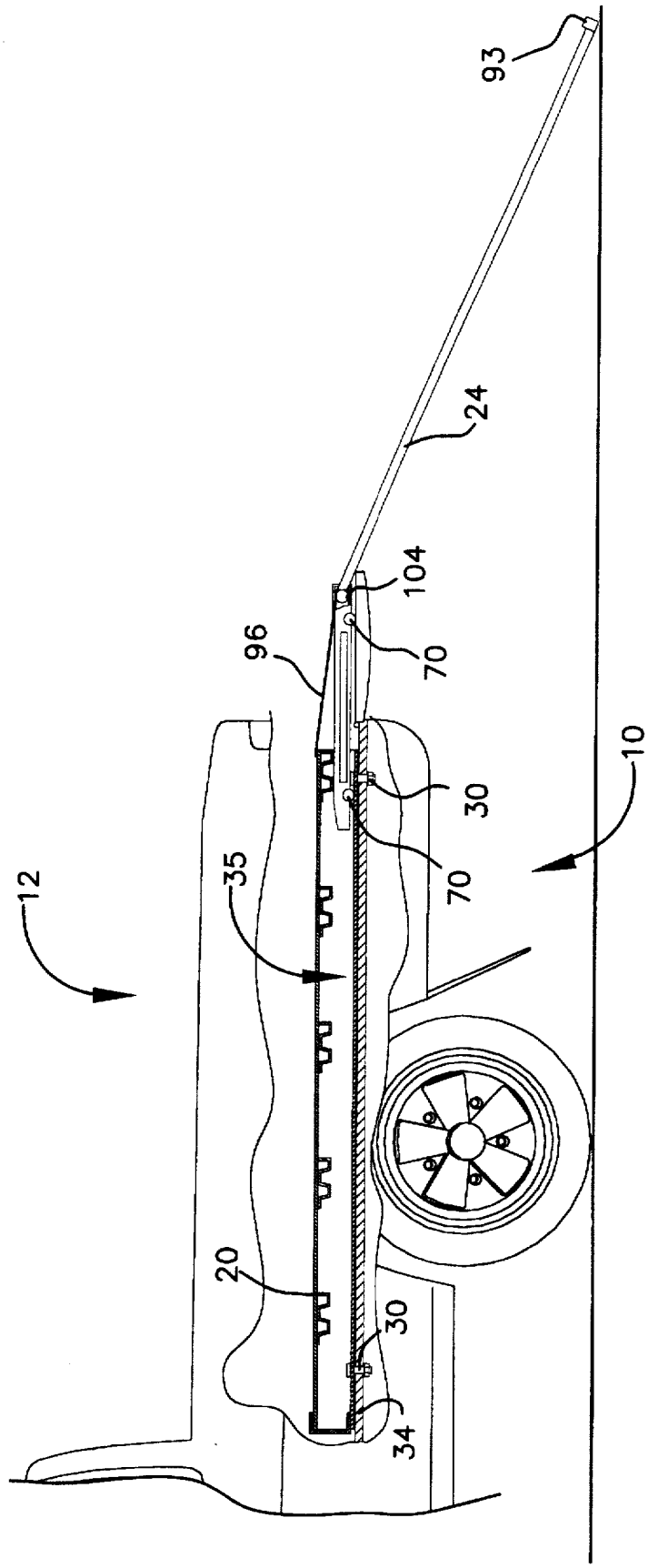
FIG. 1B is an enlarged view of a section of FIG. 1A.

Referring now to FIGS. 1A and 1B the ramp assembly 10 of the present invention is shown attached to a vehicle 12 and in the fully extended position. The ramp assembly 10 has three main components, a platform assembly 20, a sliding platform or member 22, and a ramp 24.

Figure 2A:
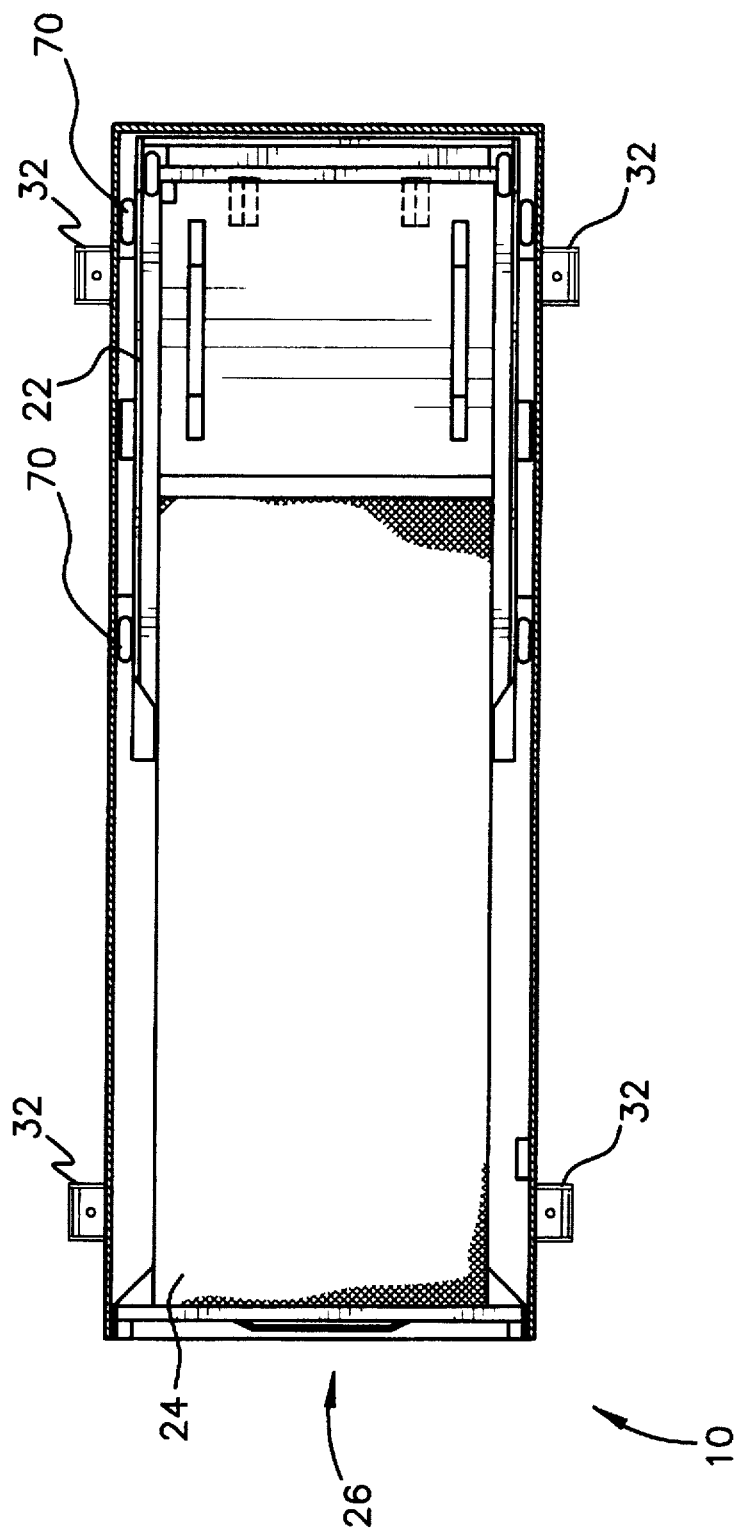
FIG. 2A shows a top view of the ramp assembly partly in section.
Figure 2B:
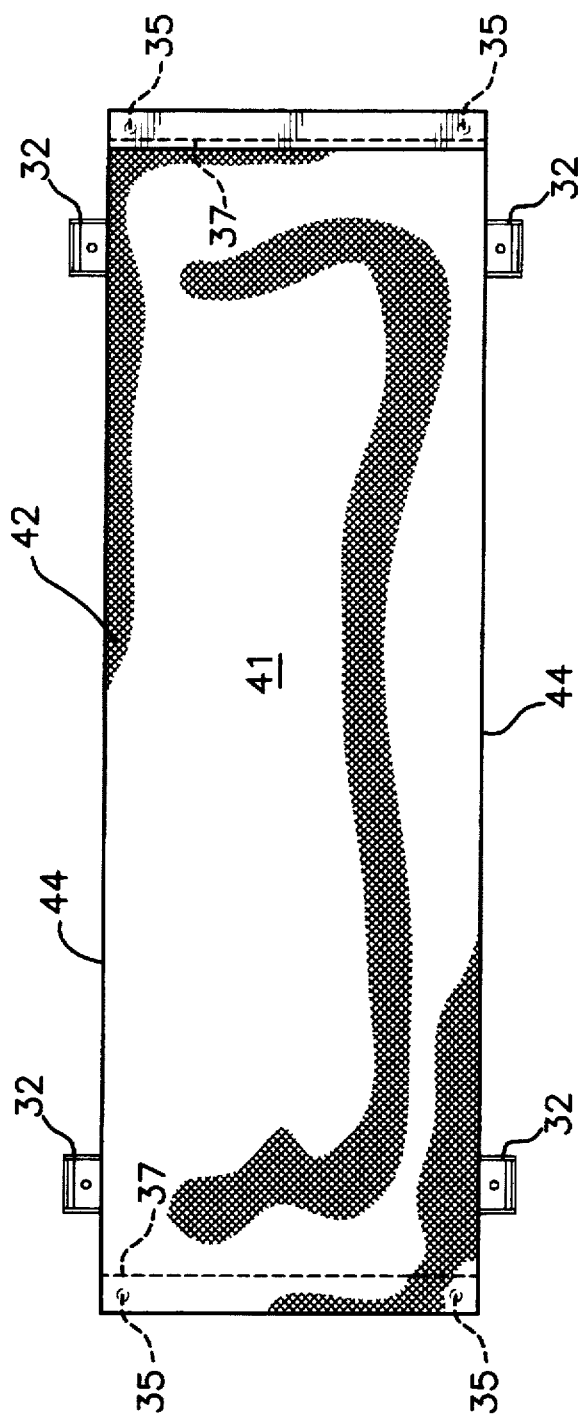
FIG. 2B shows a top view of the platform of the ramp assembly partly in section.

FIGS. 2A and 2B show the ramp assembly 10 in the fully retracted position. The ramp 24 and sliding member 22 are both contained within the hollow interior 26 of the platform 20, when the ramp assembly 10 is in the retracted position.

Referring again to FIGS. 1A and 1B, the platform assembly 20 is bolted down into the bed of the truck by bolts 30 which extend through apertured brackets 32 and into and through the floor 34 of the vehicle 12. Hex nuts 36 are used to secure the bolts 30. Thus the platform assembly 20 is securely held in place. An alternative method of securing the platform assembly is by having bolts 30 secured through apertures 33 formed in the floor 35 of the platform assembly 20 as shown in FIG. 2B. Additional transverse support members 37 may be secured to or formed in the floor 35 of the platform assembly 20. Of course, other suitable means may be used to secure the platform assembly 20.

A common problem with the prior art ramp assemblies was that a heavy load would cause vertical deflection of the weight bearing panel or load platform. Considerable deflection makes smooth extension and retraction of the ramp difficult. When factoring in environmental conditions such as mud or snow which tend to interfere with the operation of extendable ramp assemblies, extension and retraction of the ramp can become impossible. Therefore, in order to ensure smooth transport of the ramp, it is extremely important to minimize vertical deflection of the topmost or weight bearing panel in extendable ramp assemblies. Other means are provided to ensure smooth transport of the ramp 20 as will be explained later.

Figure 3:
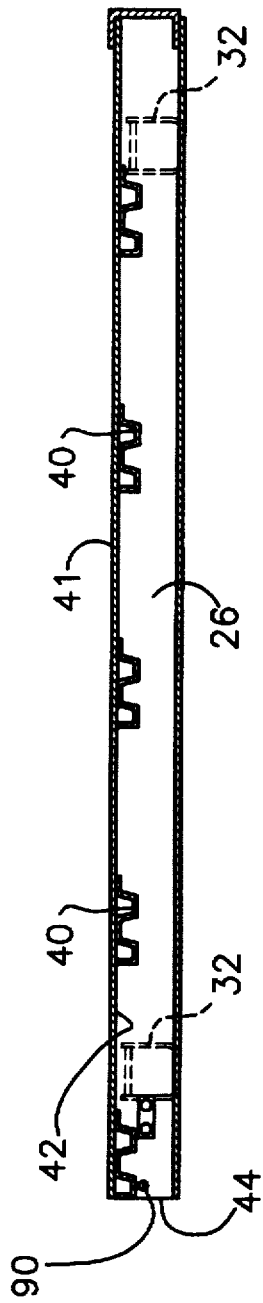
FIG. 3 shows a side view of the platform assembly partly in section.

Referring now to FIG. 3 a side view of the platform assembly 20 shows the transverse support members 40 which are disposed beneath the top surface 41 of the weight bearing panel 42. It should be noted here that the top surface 41 of the weight bearing panel 42 may be made of treadplate aluminum or other durable non-skid material. These members 40 serve to reduce the amount of deflection which occurs when relatively heavy loads are to be supported by the platform assembly 20. The support members 40 can be securely fastened to the sidewalls 44 of the platform assembly 20 thus forming a frame upon which the panel 42 may be supported. Alternatively, support members 40 can be integral with the panel 42. In either case the support members 40 should be sufficient to support the maximum load capacity of the vehicle 12 with only minimal vertical deflection.

While the top surface 41 of the weight bearing panel 42 is preferably textured or covered with a non-skid material, tread plate aluminum may be used for the panel 42 as well as the ramp 24.

Figure 4:
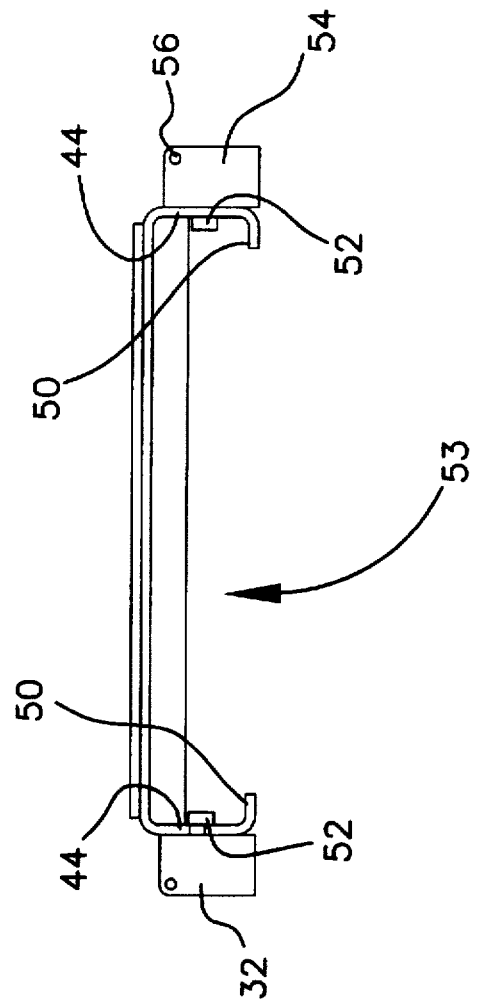
FIG. 4 shows a rear view of the platform assembly detailing the interior of the assembly.

Referring now to FIG. 4 a rear view of the platform assembly 20 looking into the interior thereof is shown. Extending inwardly from the sidewalls 44, and coextensive with the length of the platform assembly are a pair of mutually opposed wheel guides 50. The wheel guides or tracks 50 provide a slightly elevated surface for the wheels of the slide member 22 as will be explained later. The tracks 50 may also have a plurality of apertures 51 formed therein through which a rope or cable may be passed in order to secure a load. A pair of stops 52 for the slide member 22 protrude inwardly proximate the rear opening 53 of the interior 26 of the platform assembly 20. The stops 52 cooperate with a corresponding pair of adjustable stop members which are attached to the slide member 22 as will be explained in more detail later.

A pair of tie down brackets 54 on opposite sides of the rear opening 53 are adapted for securing loads to the platform assembly 20. The brackets 54 include apertures 56 for cables, ropes, and the like. The brackets 54 may be used in combination with the apertures 51 in the tracks 50 to secure the load.

Figure 5:
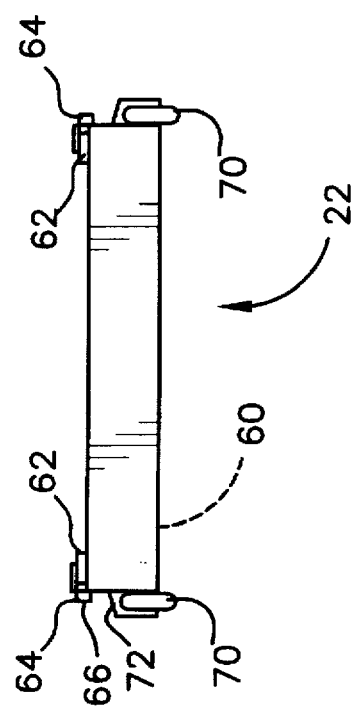
FIG. 5 shows a rear view of the sliding platform which can be contained within the platform assembly.

Referring now to FIG. 5 a rear view of the slide member 22 is shown. The slide member 22 has a bottom panel 60 and opposing sidewalls 62 but no top panel. This configuration reduces the possibility that debris buildup, e.g., mud, snow, etc., deflection of the platform assembly 20, or other factors do not interfere with the smooth transport of the ramp 24. Prior art ramp assemblies have a sliding member with a top panel whereby the clearance between the ramp and the top panel of the sliding member could affect smooth transport of the ramp. The present invention overcomes that problem by having a sliding member with an "open" top. It can be readily appreciated that even if deflection of the weight bearing panel 42 does occur it will tend to be more pronounced towards the central area of the panel 42. Since there is not top panel on the slide member 22 the panel 42 will protrude into an open space thereby not affecting the operation of the slide member 22.

Adjustably attached within an elongated aperture in the sidewalls 62 are a pair of mutually opposed stop members 64 which cooperate with stationary stop members 52 on the platform assembly 20 to adjustably limit the travel of the slide member 22 thereby allowing for adjustment of the angle of incline of the ramp 24. Stop members 64 include an aperture 66 within which a screw and corresponding nut (not shown) may be fastened to allow for loosening and repositioning the stop members 64.

The slide member 22 also includes two sets of wheels 70 which are adapted for rolling along wheel guides 50. The use of wheels in lieu of sliding contact between the ramp 24, slide member 22, and platform assembly 20 helps to increase the ease with which the ramp assembly 10 is extended by substantially reducing the contact surface area between the slide member 22 and the interior 26 of the platform assembly 20.

A plastic guide strip 72 extends lengthwise along the exterior of the sidewall 62 and serves to guide the slide member 22 within the platform assembly 20. The guide strip 72 helps to ensure that the sliding member 22 is centrally located within the platform assembly 20 thereby allowing for smooth extension and retraction of the ramp 24. The guide strip may be made from any rigid, durable plastic such as polyvinyl chloride or other similar material.

Wheel stops 74 extend inwardly at the rear end of the slide member 22 as shown in FIGS. 5 and 6. The wheel stops 74 serve to limit the rearward travel of the ramp 24 as will be explained later. Connected to and integral with the wheel stops 74 is a retainer 76 which keep the ramp wheels from disengaging from the slide member. At the opposite end of the slide member 22 is an angled stop member 80 which serves to limit forward travel of the ramp 24. In the preferred embodiment, the slide member 22 is made entirely from aluminum.

Figure 8:
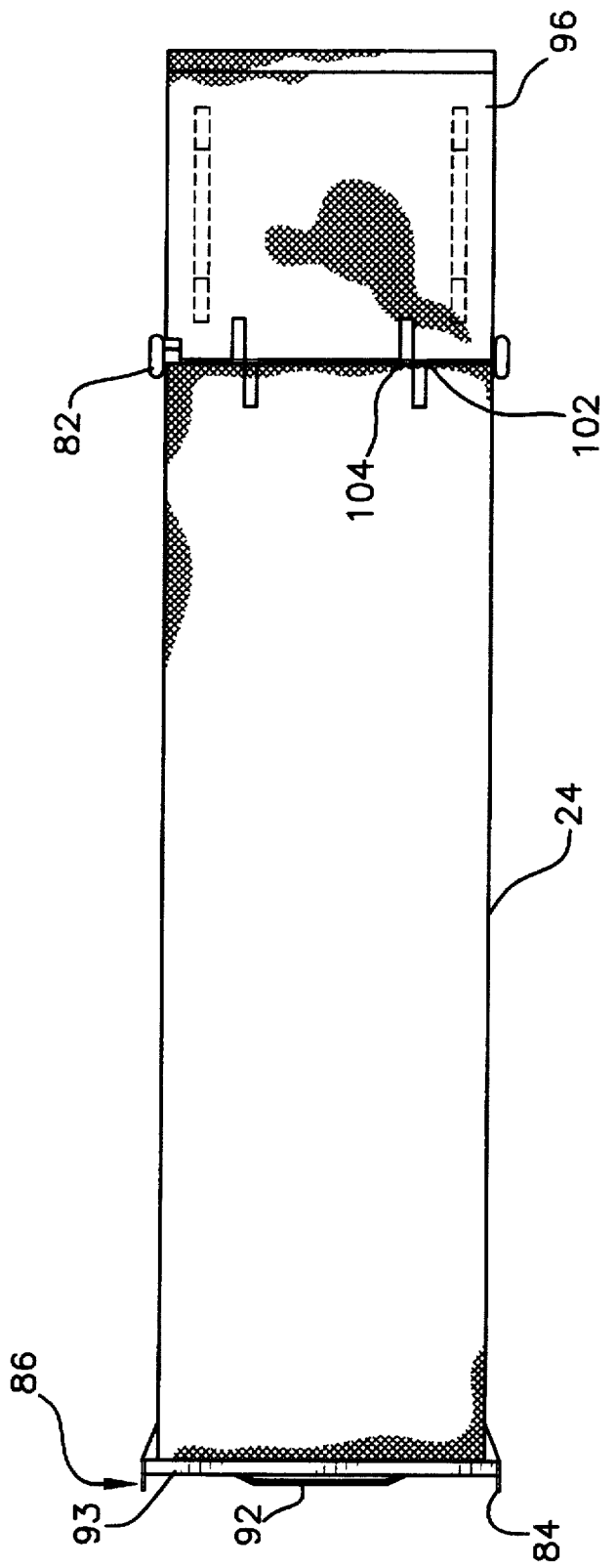
FIG. 8 shows a top view of the extendable ramp.

Referring now to FIGS. 7 and 8 the ramp 24 rolls within the slide member 22 the width of the ramp 24 being limited by the distance between the sidewalls 62 of the slide member 22. The ramp 24 has a pair of wheels 82 at the forward end which can roll freely within the slide member 22 between stops 80 and 74.

The ramp 24 includes a pair of locking plates 84 at the rear end each having an aperture 86 through which a bolt or other suitable fastening means may be inserted when the ramp 24 is fully within the platform assembly 20 and the apertures 86 are aligned with the aperture 90 in the locking plates 88 (FIG. 3) of the platform assembly 20.

An elongated horizontally extending aperture formed in the ramp 24 provides a handle 92 for grasping the ramp 24 for extension or retraction. A pipe closer 93 is secured to the end of the ramp 24 and is adapted to be received within a recess 94 which is formed in the sidewalls of the platform assembly 20 as is seen more clearly in FIG. 1B.

An extension plate 96 is hingedly connected to the forward end of the ramp 24 and serves to bridge the gap between the ramp 24 and the weight bearing panel 42. When the ramp 24 is fully extended the plate 96 is in the position shown in FIG. 8. When the ramp 24 is to be retracted it is foldable as shown in FIG. 9 into the storage position. As is the case with the platform assembly 20 the top surface 100 of the ramp 24 and extension plate 96 is covered with a non-skid material and is preferable made of treadplate aluminum. The extension plate 96 can be made removable by providing three fixed pins 102 which allow for removal of the extension plate 96 by sliding the plate 96 to one side thereby sliding the pins 102 out of engagement with the hinge members 104 which have an internal bore (not shown) adapted to receive the pins 102. In the preferred embodiment the hinge members 104 are made of steel and are bolted rather than welded. Alternatively the hinge members 104 themselves may be removable.

In operation, the assembly 10 may be set up for loading by opening the tailgate 109 of the vehicle 12 and extending the ramp 24 fully from the platform assembly until the limit of travel of the slide member 22 and the ramp 24 is reached. Adjustment of the travel of slide member 22 may be effected as has been previously explained. The extension plate 96 may then be pivoted to cover the gap between the ramp 24 and the weight bearing panel 42. For storage, the procedure is simply reversed.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims:

I claim:

1. An adjustable extendable ramp apparatus for mounting on a truck or other vehicle comprising:

a platform assembly having a top, opposing sides, a closed front end and an open rear end, and a hollow interior, said interior having a pair of longitudinally extending track members formed on opposite sides thereof and a plurality of evenly spaced transverse support members underneath said top, and mounting means for securely mounting said platform assembly to said vehicle;

a sliding platform contained within said platform assembly, said sliding platform having a pair of upstanding sidewalls, front and rear pairs of opposing wheels rotatably connected to said sidewalls, a single horizontal panel, said horizontal panel extending between and attached to a lower interior portion of said sidewalls of said sliding platform so as to form an open space between said sidewalls above said horizontal panel thereby providing clearance between said top and said horizontal panel, said pairs of wheels adapted to roll within said track members thereby allowing said sliding platform to be slidably displaced in the longitudinal direction within said hollow interior of said platform assembly;

an extendable ramp connected to said sliding platform and movable therewith between a fully extended position and a fully retracted position, said ramp having a pair of wheels on opposite sides thereof at a first end and a handle at a second end and also having an extension member pivotally connected to said ramp, whereby clearance between said top panel and said horizontal panel of said sliding platform facilitates extension and contraction of said under heavy load conditions.

2. The device of claim 1 wherein said transverse support members reduce vertical deflection of the top of said platform assembly.

3. The device of claim 1 including adjustment means for adjusting the travel of said sliding platform.

4. The device of claim 1 including locking means for holding said ramp stationary relative to said platform assembly.

5. The device of claim 1 including means for securing a load to said platform assembly.

* * * * *